United States Patent [19]

Holland

[11] 3,945,668
[45] Mar. 23, 1976

[54] HITCH ASSEMBLY FOR GOOSE NECK TRAILER

[75] Inventor: Ronald E. Holland, Forest City, Iowa

[73] Assignee: Winnebago Industries, Inc., Forest City, Iowa

[22] Filed: Jan. 2, 1975

[21] Appl. No.: 537,906

[52] U.S. Cl. .......................... 280/423 R; 280/490 R
[51] Int. Cl.² .......................................... B62D 53/06
[58] Field of Search ........ 280/423 R, 423 B, 425 A, 280/425 R, 475, 490, 150.5

[56] References Cited
UNITED STATES PATENTS

| | | | |
|---|---|---|---|
| 2,555,336 | 6/1951 | Hagely | 280/150.5 X |
| 2,667,363 | 1/1954 | Talbert | 280/425 A |
| 2,788,145 | 4/1957 | Clark | 280/425 R X |
| 2,962,298 | 11/1960 | Hefling | 280/150.5 |
| 3,239,238 | 3/1966 | Van Raden | 280/423 B X |
| 3,567,271 | 3/1971 | Gostomski | 280/475 X |
| 3,800,966 | 4/1974 | Newton | 280/423 R X |

Primary Examiner—M. H. Wood, Jr.
Assistant Examiner—John A. Pekar
Attorney, Agent, or Firm—Burd, Braddock & Bartz

[57] ABSTRACT

A hitch assembly connecting the tongue of a goose neck trailer to a pickup truck. The hitch assembly has a fixed, downwardly directed tubular member accommodating a movable tubular member carrying a coupling attachable to a king pin secured to the frame of a pickup truck. An elongated screw located within the tubular members is operable to move the movable tubular member relative to the fixed tubular member to change the overall length of the tubular members. A clamp assembly secured to the fixed tubular member is operable to hold the movable member in a fixed position.

26 Claims, 8 Drawing Figures

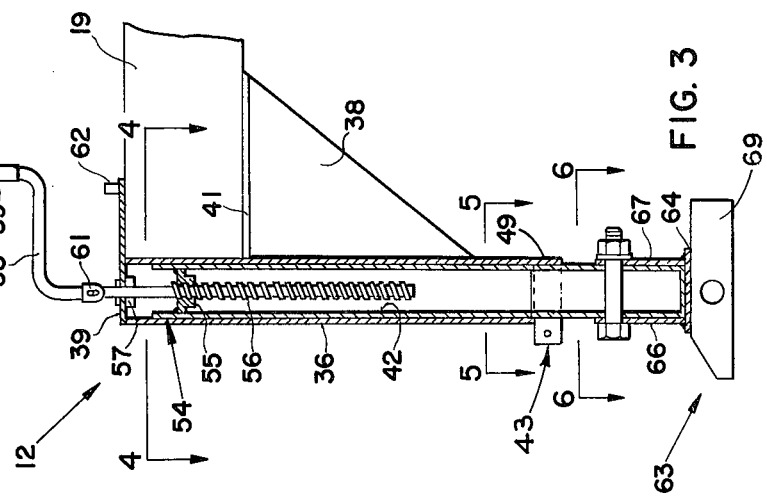
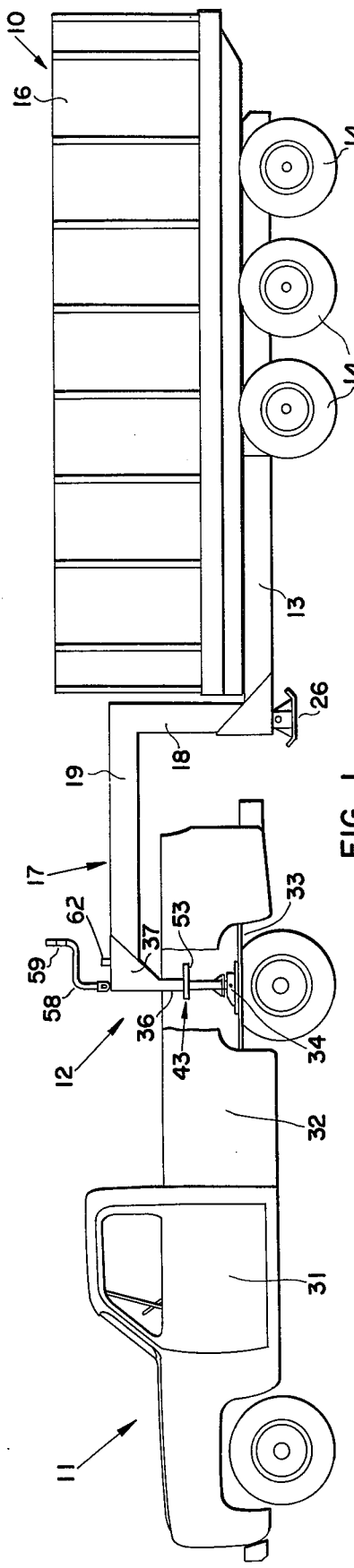
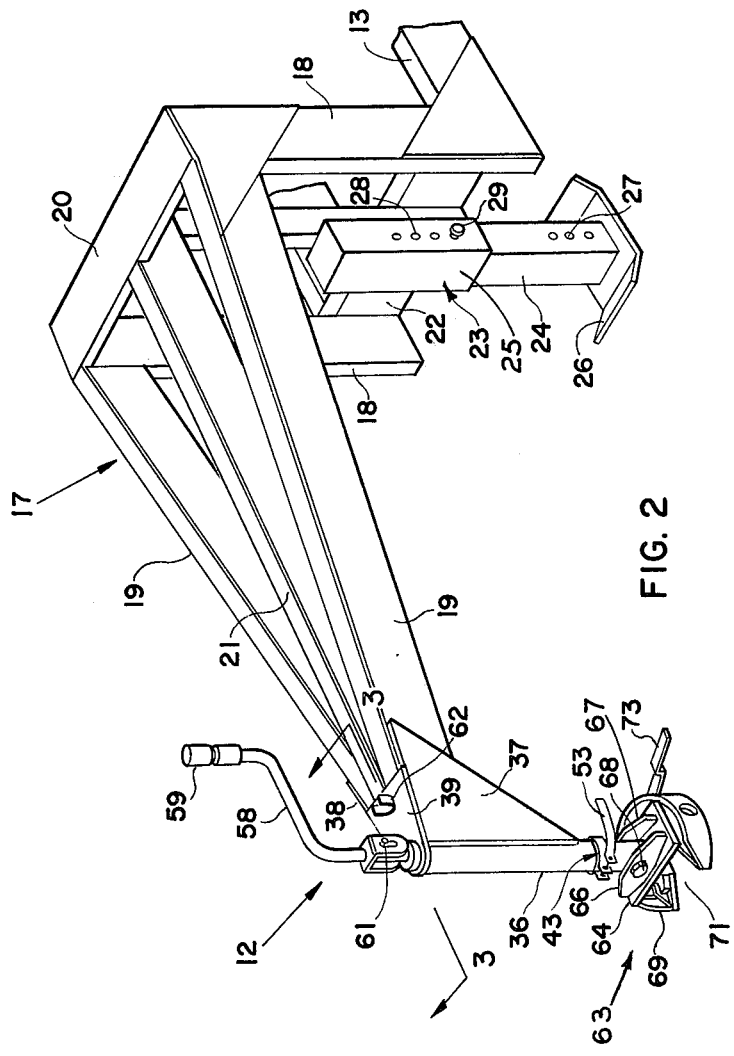

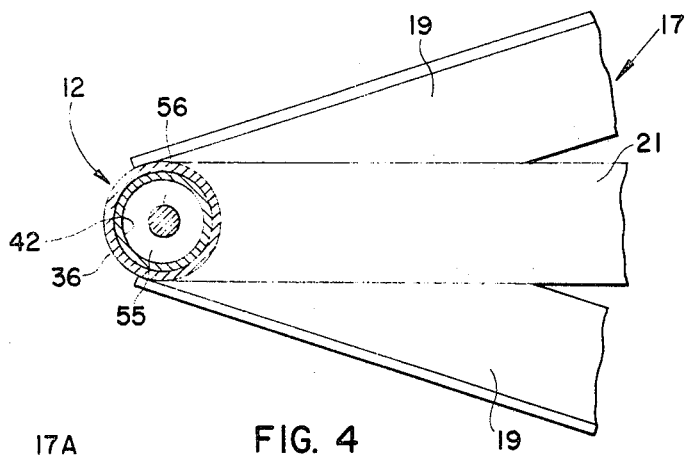
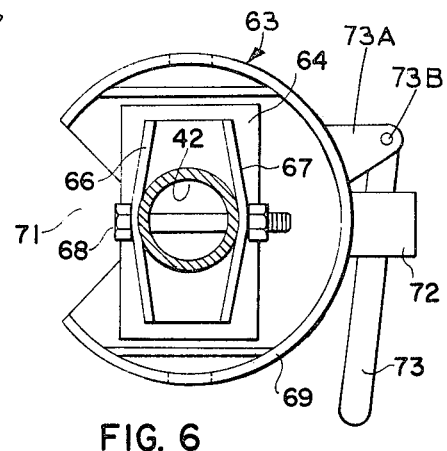
FIG. 4
FIG. 6
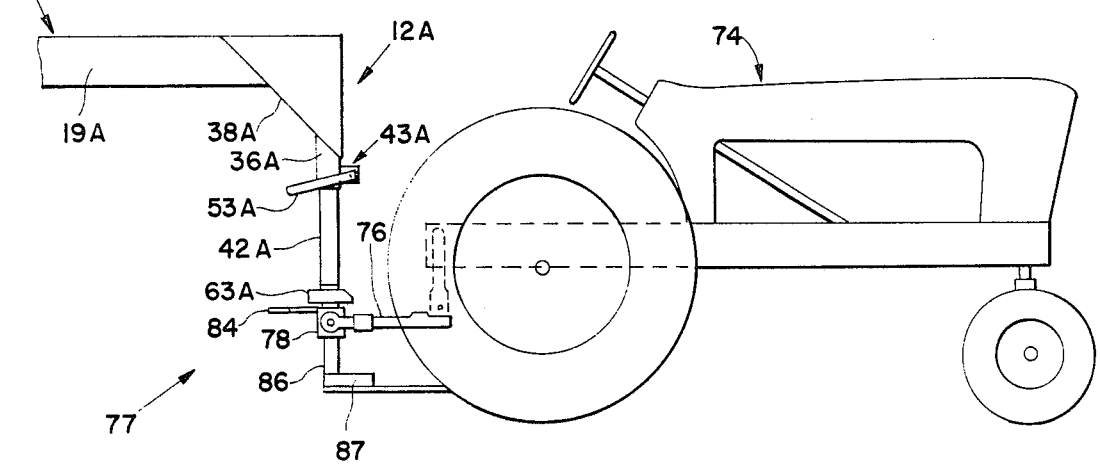
FIG. 7
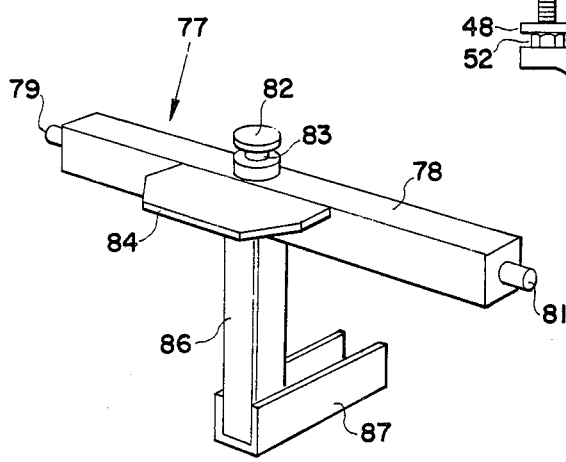
FIG. 8
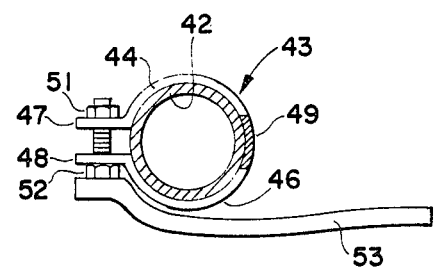
FIG. 5

3,945,668

HITCH ASSEMBLY FOR GOOSE NECK TRAILER

BACKGROUND OF INVENTION

Trailers having goose neck tongues are equipped with hitch assemblies to connect the trailer to a towing vehicle such as a pickup truck. The hitch assemblies are also connectable to the draw bars of tractors. Upright support structures of the hitch assemblies are adjustable in length to accommodate different elevations of coupling structures of the towing vehicles. The vertical adjustment of the hitch assemblies has been achieved in various ways. Telescopic members that are pinned together are shown in U.S. Pat. No. 3,527,476 U.S. Pat. No. 3,796,444. A hydraulic cylinder is used to change the elevation of the hitch assembly in U.S. Pat. No. 2,844,265. Additional attaching structure is used to provide the hitch assembly with a low hitch point in U.S. Pat. No. 3,733,089. Screw threads are used in hitches shown in U.S. Pat. No. 3,035,856 and U.S. Pat. No. 3,843,163.

SUMMARY OF INVENTION

The invention is directed to a hitch assembly for connecting a first vehicle to a second vehicle. More particularly, the hitch assembly is used to connect a fifth wheel trailer having a forwardly directed tongue to a towing vehicle such as a pickup truck or tractor. The hitch assembly has a downwardly projected tubular means conected to the forward end of the tongue of the trailer. An elongated member is slidably positioned in telescopic relation with the tubular means. The member has a portion extended downwardly from the tubular means and connected to a coupling. The coupling is adapted to be attached to a king pin secured to the towing vehicle. Extendable and contractible means located within the tubular means is connected to the tubular means and member. The extendable and contractible means is operable to provide movement of the member into and out of the tubular means to change the overall vertical length of the hitch assembly. The extendable and contractible means includes a nut having a threaded opening secured to the member. An elongated screw threaded through the nut is attached to a bearing mounted on the upper end of the tubular means. A crank secured to the top of the screw is usable to rotate the screw and thereby move the member relative to the tubular means. Clamp means located around the member holds the member in a fixed position relative to the tubular means. The clamp means is secured to the tubular means. Specifically, the clamp means is formed by cutting arcuate slots in the tubular means to define first and second arcuate bands located adjacent the opposite sides of the second member. A hand-operated lever is used to turn a bolt used to hold the first band and second band in firm engagement with the second member.

An object of the invention is to provide a vertically adjustable hitch assembly for a goose neck trailer that has a compact, enclosed and protected adjusting structure. Another object of the invention is to provide a clamp structure for a vertically adjustable hitch assembly that is operable to lock the hitch assembly in a fixed vertical position. Another object of the invention is to provide a screw operated adjusting structure for a vehicle hitch that is reliable and easy to use, is sturdy and low cost in construction, and has long life and low maintenance. Yet another object of the invention is to provide a vertically adjustable hitch assembly operable to horizontally level a fifth wheel trailer to compensate for differences in height of the coupling towing structure of a draft vehicle. A further object of the invention is to provide a hitch for a fifth wheel trailer that has a tow coupling capable of turning about an upright axis to allow a hook-up to a towing vehicle located at an angle to the trailer.

IN THE DRAWINGS

FIG. 1 is a side elevational view of a fifth wheel trailer connected to a pickup truck with the hitch assembly of the invention;

FIG. 2 is an enlarged perspective view of the hitch assembly connected to the gooseneck tongue of the trailer;

FIG. 3 is an enlarged sectional view taken along line 3—3 of FIG. 2;

FIG. 4 is an enlarged sectional view taken along line 4—4 of FIG. 3;

FIG. 5 is an enlarged sectional view taken along line 5—5 of FIG. 3;

FIG. 6 is an enlarged sectional view taken along lone 6—6 of FIG. 3;

FIG. 7 is a side elevational view of the hitch assembly mounted on the draft links of the hitch of an agricultural tractor; and FIG. 8 is a perspective view of the hitch bar used to mount the hitch assembly to the draft links.

DESCRIPTION OF PREFERRED EMBODIMENT

Referring to FIG. 1, there is shown a vehicle indicated generally at 10 known as fifth wheel trailer being towed with a pickup truck 11. A hitch assembly indicated generally at 12 connects the trailer 10 to the truck 11.

The trailer 10 has a base or frame 13 carrying a plurality of wheels 14 for movably supporting the trailer on the ground. An open top box 16 is mounted on the frame. Other types of structures, as cargo vans, flat beds and the like, can be mounted on frame 13. A gooseneck tongue indicated generally at 17 is connected to the front of frame 13. Hitch assembly 12 is mounted on the forward end of tongue 17. Tongue 17 comprises a pair of upright frame members 18 and forwardly converging horizontal members 19. Members 19 are secured by welds or the like to the upper ends of the members 18. A cross member 20 is secured to the upper ends of members 18. A central member 21 is located between members 19 and is attached to member 20 and the forward ends of members 19. Frame 13 has a front cross member 22 extended between the lower ends of upright members 18.

A stationary support gear 23 is secured to the center portion of cross member 22. The support gear 23 comprises an outer square tube 25 secured by welds or the like to a center upright secured to member 22. Movably positioned in tube 25 is a square inner tube 24. A plate or foot member 26 is secured to the bottom end of member 24. Member 24 telescopes up into the tube 25 and is held in either its extended or contracted position with a member 29 such as a pin. Pin 29 is adapted to extend through aligned holes 27 and 28 in members 24 and 23, respectively. An hydraulic cylinder (not shown) can be used in lieu of pin 29 to move and hold the tube 24 between its extended position shown in FIG. 2 and its contracted position shown in FIG. 1.

The pickup truck 11 is a conventional vehicle having a cab 31 and an open top body 32. The bottom of the body 32 has a horizontal bed 33. A king pin assembly 34 is secured to the center portion of bed 33 above the rear wheels of the truck. The king pin assembly comprises a plate secured to bed 33. An upright pin having an annular groove is mounted on the center portion of the plate. The pin has the shape of pin 82 shown in FIG. 7.

The hitch assembly 12 shown in FIGS. 2 and 3 has a first downwardly directed tubular member or tube 36. Triangular gusset or side plates 37 and 38 are secured to opposite sides of tube 36 and to the forward ends of tongue members 19. A horizontal top plate 39 is secured to the top of tube 36 and the tongue members 19 and 21. A second plate 41 is secured to the lower side of tongue members 19 and 21 and gusset plates 37 and 38. A second tubular member or inner tube 42 is slidably and rotatably disposed in the first tube 36. As shown in FIG. 4, inner tube 42 is located in a relatively close slide fit with the inner cylindrical wall of the outer tube 36. The second tube 42 moves into and out of the lower end of tube 36 and can rotate about its vertical axis. The bottom end of tube 42 is closed to prevent dirt, snow and ice from accumulating in tube 42.

A clamp indicated generally at 43 is located at the lower end of tube 36 operable to hold the inner tube 42 in a fixed position with the outer tube 36. As shown in FIG. 5, clamp 43 comprises opposite disposed arcuate side bands 44 and 46 extended around tube 42. The adjacent ends of bands 44 and 46 have outwardly directed ears 47 and 48. Bands 44 and 46 are connected to tube 36 with neck portion 49. Bands 44 and 46 are formed by cutting slots in the lower end of tube 36 and leaving the neck portion 49 to connect the bands to tube 36. Ears 47 and 48 are secured by welds or the like to the adjacent ends of bands 44 and 46.

A nut 51 is secured to the ear 47. A bolt 52 extended through aligned holes in ears 47 and 48 is threaded into nut 51. A handle or arm 53 secured to bolt 52 is used to manually rotate bolt 52 and thereby move bands 44 and 46 into and out of clamping relation with the second tube 42. When handle 53 is moved in the direction to force the ears 47 and 48 toward each other, bands 44 and 46 are clamped about the second tube 42, thereby holding tube 42 in fixed rotational and longitudinal positions with first tube 36.

The inner tube 42 is moved to its extended and contracted positions with an extension and contraction means indicated generally in FIG. 3 at 54. The extension and contraction means 54 includes a nut 55 secured by welds or the like to the upper part of the second tube 42. An elongated screw 56 is threaded through nut 55 and extended downwardly along the longitudinal axis of tubes 36 and 42. Screw 56 extends through a thrust bearing 57 mounted on the top plate 39. The screw 56 is rotated with the use of a crank 58. Crank 58 has an upwardly directed handle 59 operative to be manually gripped so that a rotating force may be applied to the crank 58. The opposite end of crank 58 has a generally U-shaped yoke carrying a pin 61 which pivotally joins the yoke to the upper end of screw 56. The pin 61 permits the crank 59 to be pivoted about a generally horizontal axis. The crank 59 can be pivoted in a downward direction between a generally U-shaped holding clip 62 secured to a part of the top plate 39.

A coupling indicated generally at 63 releasably connects the inner tube 42 to the fixed king pin attached to the frame of truck 11. As shown in FIG. 6, coupling 63 has a horizontal plate 64. A pair of spaced upright flanges 66 and 67 are secured to the top of plate 64. Flanges 66 and 67 are located adjacent opposite sides of the lower end of tube 42. A longitudinal horizontal pin or nut and bolt assembly 68 pivotally connects flanges 66 and 67 to tube 42. Plate 67 is pivotally mounted on an arcuate housing 69 having a forwardly open mouth 71. An actuator 72 is connected to a lock mechanism (not shown) adapted to grip the king pin. A lever 73 connected to actuator 72 is pivoted on an arm 73A with pivot pin 73B whereby movement of lever 73 will move actuator 72 to a first position to lock mechanism about the king pin. Movement of the lever in the opposite direction to a second position will release the lock mechanism from the king pin. Coupling 63 is a commercial assembly and the details of the structure are not part of the present invention.

Coupling 63 can be a Brinkley fifth wheel attachment and king pin plate. An example of this structure is sold by the Brinkley Company of Warrenton, Missouri. Other types of coupling assemblies can be used to connect the second tube 42 to the towing vehicle. For example, the couplings disclosed in U.S. Pat. Nos. 3,733,089 and 3,796,444 can be used to connect tube 42 to pickup truck 11.

Referring to FIGS. 7 and 8, there is shown a hitch assembly 12A for connecting the tongue 17A of a vehicle such as a fifth wheel trailer to a towing vehicle indicated generally at 74. Hitch assembly 12A is identical in structure to hitch assembly 12 shown in FIGS. 1–6. Like parts are identified with the same reference number having the suffix A.

The tractor 74 has a conventional rearwardly directed draft links 76 used to connect vehicles and implements to the tractor. A hitch bar indicated generally at 77 extends between draft links 76. As shown in FIG. 8, hitch bar 77 has oppositely extended stub axles 79 and 81 adapted to be mounted on the ends of draft links 76. An upwardly directed king pin 82 is secured to the center portion of cross member 78. King pin 82 has an annular groove 83 adapted to receive the jaws of coupling 63A. A plate 84 is secured to cross member 78 and extends rearwardly from king pin 82.

A downwardly extended leg 86 is secured to the center of the lower side of cross member 78. A forwardly directed foot 87 is secured to the lower end of leg 86. The foot 87 is adapted to engage the ground and support the hitch assembly 12A and the forward portion of the vehicle on the ground. Draft links 78 are used to raise hitch assembly 12A and foot 87 from the ground during transport of the vehicle.

In use, hitch assembly 12 is used to connect the trailing vehicle or fifth wheel trailer 10 to the towing vehicle 11. The towing vehicle 11 can be positioned at an angle relative to trailer 10 and still allow the coupling 63 to be connected to the king pin on the towing vehicle. Coupling 63 and inner tube 42 are rotatable about an upright axis when clamp 43 is released so that the open mouth of coupling 63 can be aligned with the king pin. The extendable contractable means shown as nut 55 and screw 56 is used to adjust the overall vertical length of the tubular member 36 and 42. This will level vehicle frame 13 so that coupling 63 can be connected to king pins which have different vertical heights. For example, king pin 82 shown in FIG. 7 is at a lower elevation than the king pin in the assembly 34 shown in FIG. 1. Screw 56 permits infinite vertical adjustment in the range of the length of the screw. When trailer 10 is loaded, the towing vehicle 11 will settle. The vertical position of the hitch assembly 12 is adjusted to level the trailer. The level trailer puts equal loads on each axle and improves the towing and trailing of the trailer. The screw 56 can be rotated to lift the foot 26 from the ground. Foot 26, along with inner tube 24, can then be readily moved up into the outer tube 23 and held in a retracted position with the pin 29. Inner tube 42 telescopes into the entire length of the outer tube 36. This permits a large amount of vertical extension of the hitch assembly. When tube 42 is fully extended, the trailer box 16 may be at a rearward and downward incline.

The hitch assembly 12 is locked at its fixed length by tightening clamp 43. This is done by moving arm 53 to squeeze bands 44 and 46 in tight engagement with the inner tube 42. The neck 49, being integral with outer tube 36, holds clamp 43 in a fixed relation with respect to the outer tube 36 and thereby holds the inner tube 42 at a selected position.

While there have been shown and described preferred embodiments of the invention, it is understood that changes in size, materials and structure can be made by those skilled in the art without departing from the invention.

The embodiments of the invention in which an exclusive property or privilege is claimed are defined as follows:

1. A hitch assembly for connecting a fifth wheel trailer having a forwardly directed tongue to a towing vehicle comprising: first downwardly projected tubular means connected to the forward end of the tongue of the trailer, an elongated second member slidably positioned in telescopic relation with the first tubular means, said second member having a portion extended downwardly from the first tubular means, means for connecting the portion of the second member to the towing vehicle, an extendable and contractible means connected to the first tubular means and the second member operable to provide relative movement between the first means and the second member to change the overall length of the first means and second member, said extendable and contractible means including means having a threaded opening secured to the second member, an elongated screw threaded through the threaded opening, bearing means mounting the screw on the first means, crank means secured to the screw usable to rotate the screw, clamp means around the second member to hold the second member in a fixed position relative to the first member, said clamp means having a first arcuate band adjacent one side of the second member and a second arcuate band adjacent the side opposite the one side of the second member, means securing the first band and second band to the first means, and means to hold the first band and second band in firm engagement with the second member.

2. The hitch assembly of claim 1 wherein: the first tubular means comprises a downwardly extended tube having an upper end secured to the tongue, and side plates securing opposite sides of the tube to the tongue.

3. The hitch assembly of claim 2 including: a top plate secured to the top of the tongue and to the top of the first means, said bearing means being mounted in the top plate, said elongated screw extended downwardly in the tube.

4. The hitch assembly of claim 1 wherein: the means for connecting the second member to the towing vehicle comprises a coupling assembly adapted to be releasably connected to a king pin secured to the towing vehicle.

5. The hitch assembly of claim 4 including: pivot means for pivotally connecting the coupling assembly to the second member.

6. The hitch assembly of claim 1 wherein: the first band and the second band are joined to a back member, said back member being integral with the first means, said back member comprising the means securing the first band and second band to the first means.

7. The hitch assembly of claim 6 wherein: the first band and second band are separated from the lower portion of the first tubular means with horizontal slots.

8. The hitch assembly of claim 1 wherein: said means to hold the first band and second band in firm engagement with the second means comprises a nut and bolt assembly operable to clamp the first band and second band on the second member.

9. The hitch assembly of claim 8 including: handle means connected to the nut and bolt assembly to facilitate the clamping and releasing of the first band and second band from the second member.

10. A hitch assembly for connecting a first vehicle having a forwardly directed tongue to a second towing vehicle comprising: first downwardly extending tubular means connected to the forward end of the tongue of the first vehicle, second elongated means positioned in telescopic relation with the first tubular means and extended downwardly from the first tubular means, means for connecting the second means to the second vehicle, extendable and contractible means located within the first tubular means, said extendable and contractible means having a first portion secured to the second means, second portion mounted on the first means, and means to move the first and second portions relative to each other and to provide relative movement between the first means and the second means to change the combined length of the first means and second means, clamp means located around the second means to hold the second means in a fixed position relative to the first means, said clamp means having band means positioned adjacent opposite parts of the second means, means securing the band means to the first means, and means to hold the band means in firm engagement with the second means.

11. The hitch assembly of claim 10 wherein: said band means comprises a first arcuate band adjacent one side of the second means and a second arcuate band adjacent the side opposite the one side of the second means, and said means to hold the band means in firm engagement with the second means comprises a nut and bolt assembly operable to clamp the first band and second band on the second means.

12. The hitch assembly of claim 11 wherein: the first band and second band are joined to a back member integral with the first means, said back member comprising the means securing the band means to the first means.

13. The hitch assembly of claim 11 including: handle means connected to the nut and bolt assembly to facilitate the clamping and releasing of the band means.

14. A hitch assembly for connecting a fifth wheel trailer having a forwardly directed tongue to a towing vehicle comprising: a first downwardly projected tubular means connected to the forwardly directed tongue, side gusset plates secured to opposite sides of the first tubular means and the tongue, top plate means secured to the top of the tongue and first tubular means, an elongated second member slidably positioned in telescopic relation with the first tubular means, means attached to the second member for connecting the second member to the towing vehicle, and an extendable and contractible means connected to the top plate means and second member operable to provide relative movement between the first means and the second member to change the combined length of the first means and second member.

15. The hitch assembly of claim 14 wherein: the extendable and contractible means includes an elongated threaded rod, bearing means mounting the rod on the top plate means, nut means having a threaded opening accommodating the threaded rod secured to the second member, and crank means secured to the upper end of the rod usable to rotate the rod to thereby move the second member relative to the first means.

16. THe hitch assembly of claim 14 including: clamp means secured to the first means and engageable with the second member to hold the second member in a fixed position relative to the first means.

17. The hitch assembly of claim 14 wherein: the means for connecting the second member to the towing vehicle comprises a coupling assembly adapted to be releasably connected to the king pin secured to the towing vehicle.

18. The hitch assemlby of claim 17 including: pivot means for pivotally connecting the coupling assembly to the second member.

19. The hitch assembly of claim 14 including: clamp means secured to the first means and engageable with the second member to hold the second member in a fixed position relative to the first means, said clamp means comprising a first arcuate band adjacent one side of the second means and a second arcuate band adjacent the side opposite the one side of the second means, means securing the first band and second band to the first means, and means to hold the first band and second band in firm engagement with the second means.

20. The hitch assembly of claim 19 wherein: the first band and second band are joined to a back member integral with the first means, said back member comprising the means securing the first band and second band to the first means.

21. A hitch assembly for connecting a first vehicle having a forwardly directed tongue to a second towing vehicle comprising: first tubular means having an upright cylindrical passage connected to the tongue of the first vehicle, side gusset plates secured to opposite sides of the first tubular means and the tongue, top plate means secured to the tongue and first tubular means, second elongated means located in the upright cylindrical passage and extended downwardly therefrom, said second means being rotatable and vertically movable in said passage, means connected to the plate means and the second means operable to provide relative vertical movement between the first means and the second means to change the combined length of the first means and second means, coupling means mounted on the second means connectable to the second vehicle, said coupling means being vertically and rotatably movable with the second means, and clamp means associated with the second means to hold the second means in a fixed position relative to the first means.

22. The hitch assembly of claim 21 including: pivot means for pivotally connecting the coupling means to the second means.

23. The hitch assembly of claim 21 wherein: said clamp means comprises a first arcuate band adjacent one side of the second means and a second arcuate band adjacent the side opposite the one side of the second means, means securing the first band and second band to the first means, and means to hold the first band and second band in firm engagement with the second means.

24. The hitch assembly of claim 23 wherein: the first band and second band are joined to a back member integral with the first means.

25. The hitch assembly of claim 24 wherein: the first band and second band are separated from the lower portion of the first tubular means with horizontal slots.

26. The hitch assembly of claim 21 wherein: the means connected to the plate means and the second means includes an elongated threaded rod, means mounting the rod on the plate means, nut means having a threaded opening accommodating the threaded rod secured to the second member, and means attached to the rod usable to rotate the rod to thereby move the second means relative to the plate means.

* * * * *

UNITED STATES PATENT AND TRADEMARK OFFICE
CERTIFICATE OF CORRECTION

PATENT NO. : 3,945,668
DATED : March 23, 1976
INVENTOR(S) : Ronald E. Holland

It is certified that error appears in the above-identified patent and that said Letters Patent are hereby corrected as shown below:

Column 3, line 5, after "assembly" --34-- is omitted.

Column 4, line 13, after "to" (2nd occurrence), --lock the-- is omitted.

Column 7, Claim 18, line 1, "assemlby" should be --assembly--.

Signed and Sealed this first Day of June 1976

[SEAL]

Attest:

RUTH C. MASON
Attesting Officer

C. MARSHALL DANN
Commissioner of Patents and Trademarks